UNITED STATES PATENT OFFICE.

JAMES G. VAIL, OF CHESTER, AND JOHN D. CARTER, OF LANSDOWNE, PENNSYLVANIA.

SODIUM-SILICATE COMPOSITION.

1,139,741. Specification of Letters Patent. Patented May 18, 1915.

No Drawing. Application filed September 3, 1914. Serial No. 860,027.

*To all whom it may concern:*

Be it known that we, JAMES G. VAIL and JOHN D. CARTER, both citizens of the United States, and residents of Chester, in the county of Delaware, State of Pennsylvania, and of Lansdowne, in the county of Delaware, State of Pennsylvania, respectively, have invented certain new and useful Improvements in Sodium-Silicate Compositions, of which the following is a full, clear, and exact disclosure.

It is a fact that sodium silicate of the composition $Na_2OSiO_2$ is a chemical substance which is readily soluble in water. It is also a fact that sodium silicates may be prepared with a higher proportion of $SiO_2$ than that indicated by the above formula, and, indeed, the proportion may be increased to the extent indicated in the formula $Na_2O4SiO_2$. Commercially, it is possible to produce intermediate products of substantially any desired composition between these ratios. For the majority of commercial uses, those compositions containing a relatively high proportion of silica are the more valuable or useful but with those is found the disadvantage of difficult solubility in water, requiring, in the case of anhydrous material, special apparatus and high temperatures.

The present invention relates to a product consisting essentially of sodium silicate, which is at the same time readily soluble in cold water. Silicates of the types specified may be dried from solutions to give a product with a moisture content approximating 20%, in which condition they have the physical appearance of dryness, and are much more soluble than anhydrous material. We have found, however, that by the addition of a suitable efflorescent salt to a sodium silicate solution before drying, a product of greatly increased solubility may be prepared.

We do not wish to limit ourselves to the use of any specific efflorescent salt, as there are numerous ones which may, in greater or less degree, serve our purpose, but the preferred practice of our invention consists in adding to a solution of sodium silicate of approximately 40° Baumé (8.7% $Na_2O$, 28% $SiO_2$,) a quantity of sodium sulfate, either in anhydrous or crystal form, to the extent of 10% of the weight of silicate solution, if the dry sodium sulfate be used or an equivalent quantity of the crystals. Sodium sulfate crystals contain substantially 44% of sodium sulfate. The water is then evaporated off, in any suitable manner to produce a dry powder.

We are aware that it has been heretofore proposed to increase merely the solubility of sodium silicate by adding thereto a delequescent salt, such as chlorid of sodium or similar salts, but the resulting compositions all have the undesirable quality or property of being greatly affected by changing atmospheric conditions. The particles adhere and form lumps or large solid masses which prohibit or greatly interfere with their use in the arts. Sodium sulfate, however, is peculiarly adapted for the carrying out of this invention because of its efflorescence and its tendency to create a balanced condition in the finished product with respect to the absorption or loss of moisture.

One of the uses for which our new product is available is as a constituent of dry cold water paint which is commercially dealt with in a powdered form. Another is for the familiar process of preserving eggs in a silicate of soda solution. Sodium sulfate has the further advantage of being neutral, and of producing no harmful effect in the processes in which silicate of soda is generally used. It further tends to produce a product which will not stick together on long standing, even in a humid atmosphere, a difficulty to which silicate of soda by itself is peculiarly subject.

Among other salts which may be used in the place of sodium sulfate are sodium or potassium phosphate and potassium sulfate.

We desire it to be understood that in herein describing the final product as a "dry" powder or composition, we have reference to its physical appearance, which is that of apparent or substantial dryness as distinguished from a damp or wet material, and we, therefore, do not wish to be understood as thereby meaning that the product is entirely devoid of contained moisture.

Having thus described our invention what we claim and desire to protect by Letters Patent of the United States is:—

1. A dry water soluble sodium silicate composition containing sodium silicate and an efflorescent salt which does not react with sodium silicate.

2. A dry efflorescent powder freely soluble in cold water and comprising sodium silicate and sodium sulfate.

3. A dry water soluble composition containing sodium silicate and sodium sulfate.

4. A sodium silicate composition comprising sodium silicate and sodium sulfate and having the appearance of a dry powder and a solubility greater than commercial sodium silicate containing an equivalent amount of silica.

5. The method of producing a cold water soluble sodium silicate composition which consists in adding sodium sulfate to a solution of sodium silicate and then removing sufficient water from the solution to form a product of apparent dryness.

6. The method of producing a finely divided efflorescent cold water soluble silicate composition which consists in mixing a relatively small proportion of sodium sulfate of a solution of sodium silicate and then evaporating the solution to an apparent dryness.

7. The method of producing a dry efflorescent cold water soluble sodium silicate composition which consists in adding substantially 10% by weight of sodium sulfate solution to a sodium silicate solution, and then evaporating the water out of the solution to apparent dryness.

In witness whereof we have hereunto set our hands this first day of September 1914.

JAMES G. VAIL.
JOHN D. CARTER.

Witnesses:
HENRY W. JONES,
CHAS. LONGBOTHAM.